UNITED STATES PATENT OFFICE.

WILLIAM GARDINER, OF CHICAGO, ILLINOIS, ASSIGNOR TO EDWARD W. WICKEY, OF EAST CHICAGO, INDIANA.

ELECTROLYTE FOR STORAGE BATTERIES.

1,374,916.   Specification of Letters Patent.   Patented Apr. 19, 1921.

No Drawing.   Application filed June 9, 1919.   Serial No. 302,719.

*To all whom it may concern:*

Be it known that I, WILLIAM GARDINER, a citizen of the United States of America, and resident of Chicago, Cook county, Illinois, have invented a certain new and useful Improvement in Electrolytes for Storage Batteries, of which the following is a specification.

My invention relates to an improved electrolyte for storage batteries, and particularly to an electrolyte in which the acid solution is held by a suitable absorbent material, whereby a solid or semi-solid electrolyte compound is obtained.

My invention will be best understood from the following description of the manner in which the electrolyte is prepared: I first prepare a solution of sulfuric acid, preferably one which will test about 1,300 specific gravity at 60° Fahrenheit. To this solution I add about ten per cent. of water, and a small quantity of sodium silicate or water glass. But a small quantity of silicate is necessary, usually not over one per cent. I then add to this silicate solution a mixture consisting of equal parts of plaster of Paris and powdered soapstone or talcum, until I obtain a compound having a sponge-like consistency. The best results are usually obtained by using about two per cent. of this mixture of plaster of Paris and powdered soapstone, although these amounts may be varied to a certain degree without materially affecting the compound.

Instead of adding the mixture of plaster of Paris and powdered soapstone to the silicate and acid solution, I may omit the plaster of Paris and merely add soapstone or talcum to the silicate acid solution.

While I have described the preferred embodiments of my invention and set forth certain specific proportions for obtaining the best results, it is to be understood that I do not wish to be limited to the exact proportions disclosed, but that certain changes and modifications may be made without departing from the spirit of my invention.

What I claim as my invention is:

1. An electrolyte for storage batteries consisting of a solution of sulfuric acid, a silicate, and powdered soapstone.

2. An electrolyte for storage batteries consisting of a sulfuric acid solution, a silicate, plaster of Paris, and powdered soapstone.

3. An electrolyte for storage batteries consisting of an acid solution, sodium silicate, and powdered soapstone.

4. An electrolyte for storage batteries consisting of an acid solution, sodium silicate, plaster of Paris, and powdered soapstone.

5. An electrolyte for storage batteries consisting of an acid solution, one per cent. of silicate, and two per cent. of powdered soapstone.

6. An electrolyte for storage batteries consisting of an acid solution, one per cent. of silicate, and two per cent. of a mixture of plaster of Paris and powdered soapstone.

Signed by me at Chicago, Illinois, this 31st day of May, 1919.

WILLIAM GARDINER.